US006083460A

United States Patent [19]

Morikawa et al.

[11] Patent Number: 6,083,460

[45] Date of Patent: Jul. 4, 2000

[54] COMPONENT MEASURING APPARATUS AND COMPONENT COLLECTING APPARATUS

[75] Inventors: Naoki Morikawa; Tooru Oomori, both of Yamanashi, Japan

[73] Assignee: Terumo Kabushiki Kaisha, Tokyo, Japan

[21] Appl. No.: 09/001,660

[22] Filed: Dec. 31, 1997

[30] Foreign Application Priority Data

Mar. 11, 1997 [JP] Japan .................................... 9-056560

[51] Int. Cl.$^{7}$ ..................................................... G01N 21/00

[52] U.S. Cl. ................................ 422/56; 422/57; 422/58; 422/61; 422/82.05; 422/82.09

[58] Field of Search ................................. 422/56, 57, 58, 422/61, 82.05, 82.09

[56] References Cited

U.S. PATENT DOCUMENTS

| | | |
|---|---|---|
| 4,627,445 | 12/1986 | Garcia et al. . |
| 5,100,620 | 3/1992 | Brenneman . |
| 5,366,902 | 11/1994 | Cox et al. . |
| 5,494,638 | 2/1996 | Gullick . |
| 5,736,103 | 4/1998 | Pugh . |
| 5,846,846 | 12/1998 | Pugh . |
| 5,872,713 | 2/1999 | Douglas et al. . |

FOREIGN PATENT DOCUMENTS

| | | |
|---|---|---|
| 3-99265 | 4/1991 | Japan . |

*Primary Examiner*—Jan Ludlow
*Attorney, Agent, or Firm*—Burns, Doane, Swecker & Mathis, LLP

[57] ABSTRACT

A liquid specimen collection device includes a main body provided with a passage extending between opposite ends of the main body that defines a capillary tube liquid specimen flow path. One end of the passage opens at a tip end of the body member that is positionable adjacent a liquid specimen for introducing the liquid specimen into the passage while the opposite end of the passage opens at a body surface of the body which surrounds and extends outwardly from the opposite end of the passage. A test paper soaked in reagent is secured to the main body adjacent the opposite end of the passage. A liquid sample introduced into the passage at the tip end of the body member flows by capillary action along the passage to the opposite end of the passage where the specimen is then absorbed by the test paper. The test paper is secured to the body member at a plurality of spaced apart securement locations along a peripheral portion of the test paper with gaps being located between adjacent securement locations through which air is permitted to flow during liquid specimen flow along the liquid specimen flow path. The test paper includes a centrally located protuberance and an annular protuberance extending around the outer circumferential portion of the test paper. The end surface of the tip end of the body member can be provided with a groove extending between the outer peripheral surface of the tip end and the passage in the body member.

30 Claims, 8 Drawing Sheets

COMPONENT MEASURING APPARATUS AND COMPONENT COLLECTING APPARATUS

FIELD OF THE INVENTION

This invention generally relates to an apparatus for collecting a liquid sample such as blood. More particularly, the present invention pertains to an apparatus for collecting a liquid sample such as blood and applying the liquid sample to a test paper to permit measurement of a substance such as sugar concentration in the liquid sample.

BACKGROUND OF THE INVENTION

Known methods for measuring a component or characteristic in a liquid sample, for example the blood sugar level in a blood or urine sample, involve the use of a test strip having a measurement portion to which is to be applied the liquid sample to be tested. In use, the test strip is held at its tip and brought into contact with the liquid sample.

In the case of test strips that are designed to measure the level of sugar in an individual's blood, a needle is used to pierce or prick the individual's finger to thereby draw a blood sample. The test strip is then pressed onto the finger to cause the test strip to absorb a sample of blood. However, this method of obtaining a blood sample on a test strip can be somewhat problematic. Because this technique requires significant human involvement and typically only results in a small sample of blood for purposes of analysis, it sometimes happens that the blood sample is not accurately applied to the measurement portion of the test strip.

U.S. Pat. No. 5,100,620 discloses what is referred to as a capillary tube reagent format device that is designed to collect a sample of blood which is absorbed by a test strip that is mounted on the device. The device includes a transparent body having a hole extending between opposite ends of the body. The test strip is mounted on a shoulder encircling one end of body to form a flow passageway between the test strip and the body. A vent passageway is formed in the body and communicates the flow passageway with the atmosphere. During use, the tip of the body is brought into contact with a sample of blood, with the blood being drawn up through the hole in the body by capillary action and flowing into the flow passageway. As the blood flows through the hole in the body and into the flow passageway, air in the hole and the flow passageway is vented through the vent passageway. As the blood flows into the flow passageway, it is absorbed by the test strip. Thereafter, the device is mounted on a reader for determining a characteristic of the blood sample (e.g., blood sugar level).

This known capillary tube reagent format device is susceptible of certain disadvantages and drawbacks. In one respect, the device requires that the body be formed with a vent passageway. This means that the mold used to form the body must be appropriately designed to produce the vent passageway which increases the cost and complexity of the mold, particularly in light of the fact that the vent passageway must be quite small in size to avoid what the patent refers to as undue evaporative cooling. In addition, the configuration of the tip end of the device may make it difficult to effect a smooth flow of blood into the hole in the body. Also, when the device is mounted on a reader to determine the desired characteristics of the collected sample on the test strip, the reader may become soiled or contaminated by the liquid sample on the test strip. Further, the configuration of the test strip is not well suited to facilitating absorption of the blood sample.

SUMMARY OF THE INVENTION

In light of the foregoing, a need exists for a liquid specimen collection device that does not require formation of a vent passageway to vent air during use of the device.

It would also be desirable to provide a liquid specimen collection device in which the liquid sample is readily able to flow into the collection device from the liquid specimen source.

A need also exists for a liquid specimen collection device which is not susceptible to soiling or contaminating the measuring apparatus during measurement of the desired component or characteristic in the liquid sample.

According to the present invention, a liquid specimen collection device that is adapted to be mounted on a reading unit which measures a characteristic of a liquid specimen includes a body member having a recessed portion at one end for receiving the reading unit and a specimen introduction portion at the opposite end for placement adjacent a liquid specimen, with the body member being provided with a hole defining a capillary tube specimen flow path that is open at oppositely located first and second ends. The first end of the hole opens to the specimen introduction portion and the second end of the hole opens into the recessed portion. The body member also has a body surface that surrounds and extends outwardly from the second end of the hole. A test paper carrying a chromatic reagent and having oppositely located first and second surfaces is mounted within the recessed portion of the body member with the first surface of the test paper facing the body surface so that a liquid specimen introduced into the hole at the first end flows by capillary action through the capillary tube liquid specimen flow path towards the second end of the hole and contacts the test paper.

According to another aspect of the invention, a liquid specimen collection device that is mountable on a reading unit which measures a characteristic of a liquid specimen includes a body member provided with a hole defining a capillary tube specimen flow path that extends between opposite ends of the body member and that is open at both ends. One end of the hole opens at a tip end of the body member that is positionable adjacent a liquid specimen for introducing the liquid specimen into the hole while the opposite end of the hole opens at a body surface of the body which surrounds and extends outwardly from the opposite end of the hole. The tip end of the body member has an end surface and an outer peripheral surface with a groove being provided in the end surface of the tip end of the body member. The groove extends between the outer peripheral surface of the tip end and the hole in the body member to facilitate the flow of liquid specimen into the passage. A test paper carrying a chromatic reagent and having oppositely located first and second surfaces is mounted on the body member with the first surface of the test paper facing the body surface of the body member so that a liquid specimen introduced into the hole at the tip end flows by capillary action along the capillary tube liquid specimen flow path towards the opposite end and contacts the test paper.

Another aspect of the invention involves a liquid specimen collection device that is adapted to be mounted on a reading unit which measures a characteristic of a liquid specimen includes a body member provided with a hole defining a capillary tube specimen flow path that extends between opposite ends of the body member and that is open at both ends, with one end of the hole opening at a tip end of the body member that is positionable adjacent a liquid specimen for introducing the liquid specimen into the hole and the opposite end of the hole opening at a body surface of the body which surrounds and extends outwardly from the opposite end of the hole. A test paper carrying a chromatic reagent and having oppositely located first and second surfaces is secured to the body member with the first surface of the test paper facing the body surface of the body member so that a liquid specimen introduced into the hole at the tip end flows by capillary action along the capillary tube liquid specimen flow path towards the opposite end and contacts the test paper. The test paper is secured to the body member at a plurality of spaced apart securement locations along a peripheral portion of the test paper with gaps being located between adjacent securement locations through which air is permitted to flow during liquid specimen flow along the capillary tube liquid specimen flow path.

In accordance with a still further aspect of the invention, a liquid specimen collection device that is adapted to be mounted on a reading unit which measures a characteristic of a liquid specimen includes a body member provided with a hole defining a capillary tube specimen flow path that extends between opposite ends of the body member and that is open at both ends, with one end of the hole opening at a tip end of the body member that is positionable adjacent a liquid specimen for introducing the liquid specimen into the hole and the opposite end of the hole opening at a body surface of the body which surrounds and extends outwardly from the opposite end of the hole. A test paper carrying a chromatic reagent is secured to the main body adjacent the opposite end of the hole. The test paper is provided with an axially extending and generally centrally located protuberance that is aligned with the hole in the body member so that a liquid specimen introduced into the hole at the tip end flows by capillary action along the capillary tube liquid specimen flow path towards the opposite end of the hole where the liquid specimen contacts the protuberance of the test paper and is absorbed into the test paper.

A further aspect of the invention involves a test paper for permitting measurement of a characteristic of a liquid specimen. The test paper includes a blood absorption member for absorbing a liquid specimen. The blood absorption member carries a chromatic reagent and possesses a generally flat shape. The center portion of the blood absorption member is provided with an axially extending protuberance that extends out of the plane of the test paper. The test paper can also be provided with an annular protuberance extending around the outer circumferential portion of the test paper,

BRIEF DESCRIPTION OF THE DRAWING FIGURES

DETAILED DESCRIPTION OF THE PREFERRED EMBODIMENTS

The features and details associated with the liquid specimen collection device of the present invention and the reading unit with which the liquid specimen collection device is used are described below in the context of collecting a blood sample for measuring the blood sugar level in the blood sample. However, it is to be understood that the liquid specimen collection device and a reading unit can be used in connection with the collection of liquid samples other than blood and the measurement of characteristics other than blood sugar level.

Figure 1:
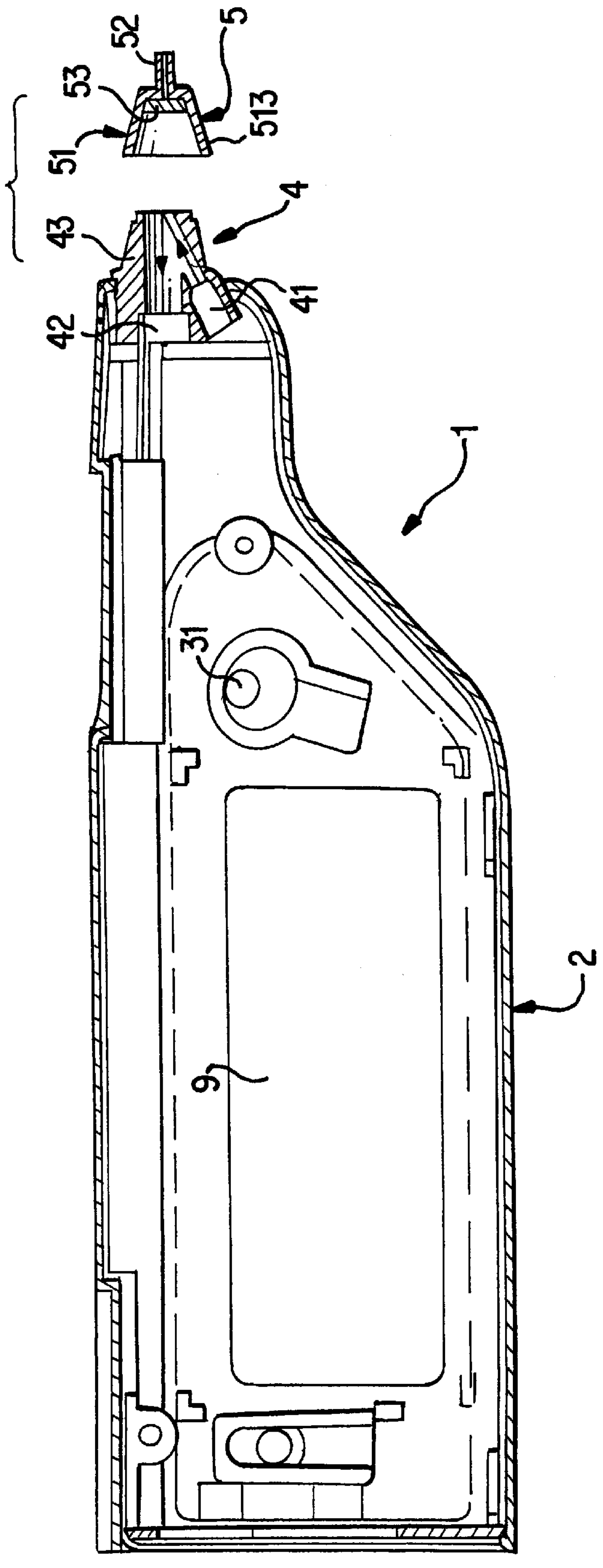
FIG. 1 is a partial cross-sectional view of a liquid specimen collection device and reading unit according to the present invention.
Figure 2:
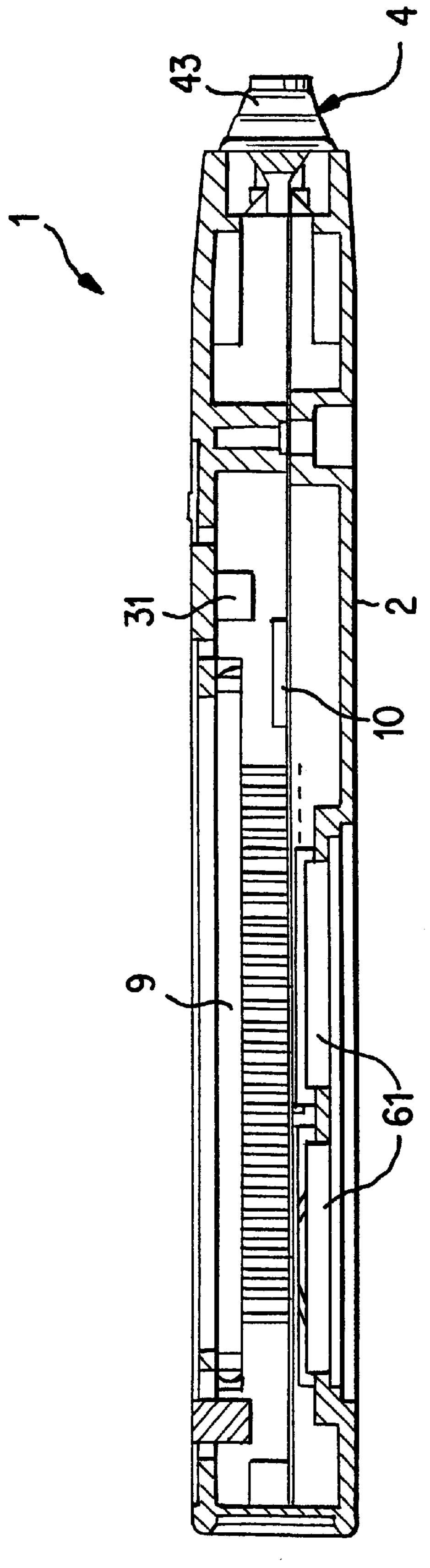
FIG. 2 is a longitudinal cross-sectional view of the reading unit shown in FIG. 1.

As seen in FIG. 1, the present invention includes the combination of a liquid specimen collection device or tip 5 and a reading unit 1. Generally speaking, as seen with reference to FIG. 1, the liquid specimen collection device 5 includes a generally cylindrically shaped body member 51 and a test paper 53 secured to one end surface of the body member 51. The collection device 5 is adapted to be used to collect a liquid sample which is absorbed by the test paper 53. The collection device 5 is also adapted to be removably mounted on the holder 43 at the end of the reading unit 1. The reading unit 1 is designed to measure a desired characteristic of the collected liquid sample (e.g., blood sugar level in a blood sample).

As seen generally in FIG. 1, the reading unit 1 includes a measuring portion 4 for effecting measurement of the desired characteristic of the liquid sample collected by the collection device 5. The measuring portion 4 of the reading unit 1 includes a luminous element 41 that emits light and a light receiving element 42. When the reading unit 1 is turned on, the luminous element 41 emits a light beam. With the collection device 5 containing a liquid specimen mounted on the holder 43, the light emitted from the luminous element 41 is irradiated onto the test paper 53 and is then reflected back and received by the light receiving element 42, whereupon photoelectric conversion is carried out. The light receiving element 42 outputs an analog signal corresponding to the amount of received light and that signal is amplified. Then, that amplified signal is converted to a digital signal by means of an A/D converter and is inputted to a control means 10, in which the desired characteristic (e.g., blood sugar level) is calculated according to data stored in the operation portion. The reading unit 1 also includes an on/off switch 31, a display 9 for displaying the results of the measurement performed by the reading unit with respect to the desired characteristic of the liquid sample, a housing 2 that houses the various components of the reading unit, several dry batteries 16 for providing power to the reading unit and a microcomputer 10.

The collection device 5 is preferably transparent or semi-transparent (colored transparent) and is designed for one time disposable use. That is, after a single use, the collection device is to be thrown away. The body member 51 includes a body portion 513 and a tip end 52. The tip end 52 is generally frustoconically shaped. During use of the collection device, the tip end 52 of the body member 51 is adapted to be brought into contact with a liquid sample or specimen (e.g., blood), with the liquid specimen being drawn up into the tip end 52 by capillary action where it then contacts and is absorbed by the test paper 53 so that the specimen is spread over the test paper 53. The tip end 52 of the body member 51 thus serves as the specimen introduction portion of the body member.

Figure 3:
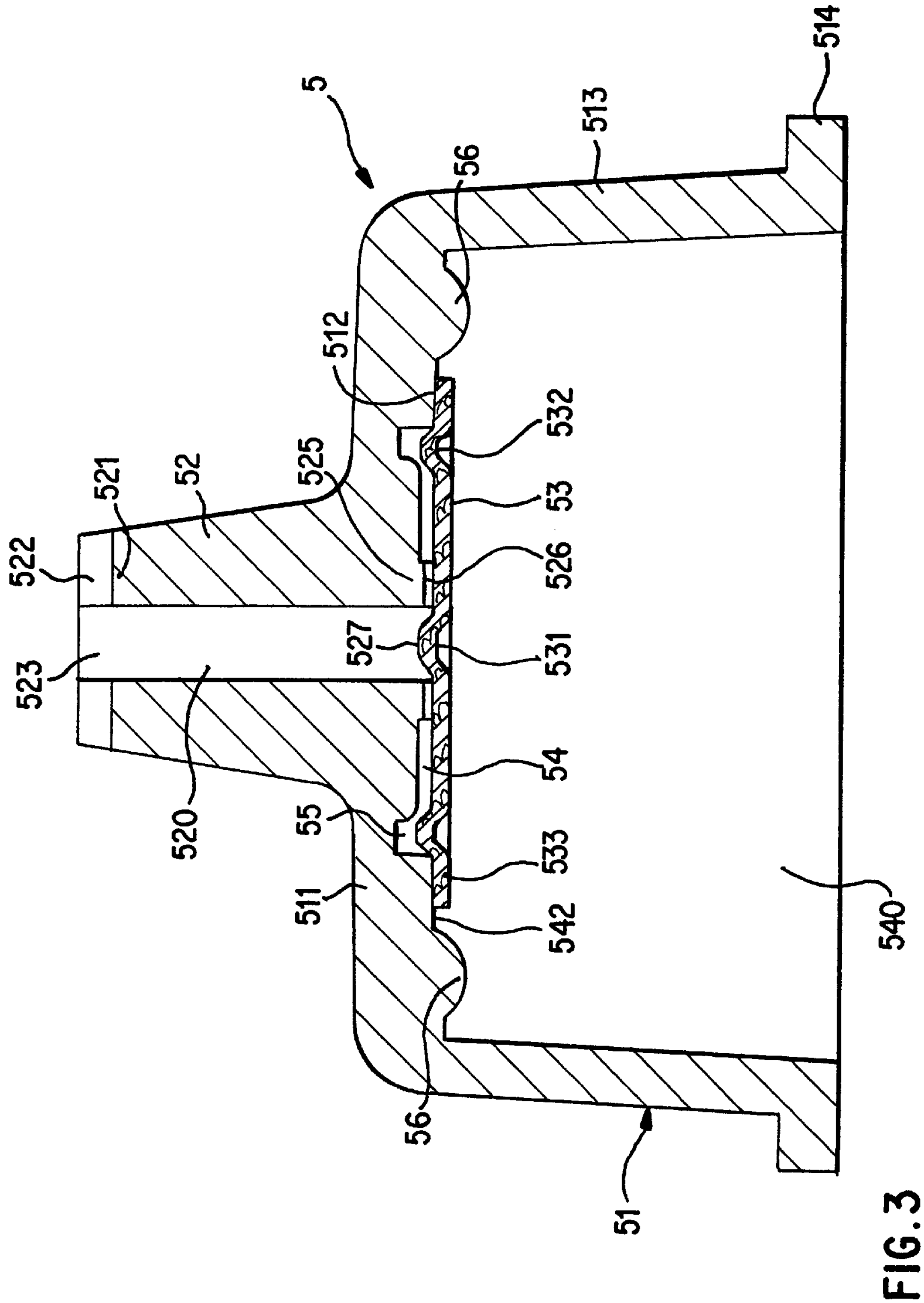
FIG. 3 is an enlarged cross-sectional view of the liquid specimen collection device shown in FIG. 1.

As shown in more detail in FIG. 3, the body member 51 includes a body portion 513 which is adapted to support the collection device 5 on the holder 43 of the reading unit 1. The body portion 513 surrounds a recessed region 540 of the body member 51, with the bottom of the recessed region 540 defining a portion of the end surface 542 of the body member 51. A part of the end surface 542 of the body member forms a seating region 512 for securing the test paper 53 to the body member 51. The body portion 513 also includes a bottom portion 511.

The body portion 51 is also provided with a radially outwardly directed annular flange 514 at the end of the body portion remote from the tip end 52. The flange 514 functions as a gripping portion on which an individual's finger can rest when the collection device 5 is fitted onto or removed from the holder 43 of the reading unit 1. Consequently, the collection device 5 can be easily and securely fitted onto and removed from the holder of the reading unit 1.

Figure 8:
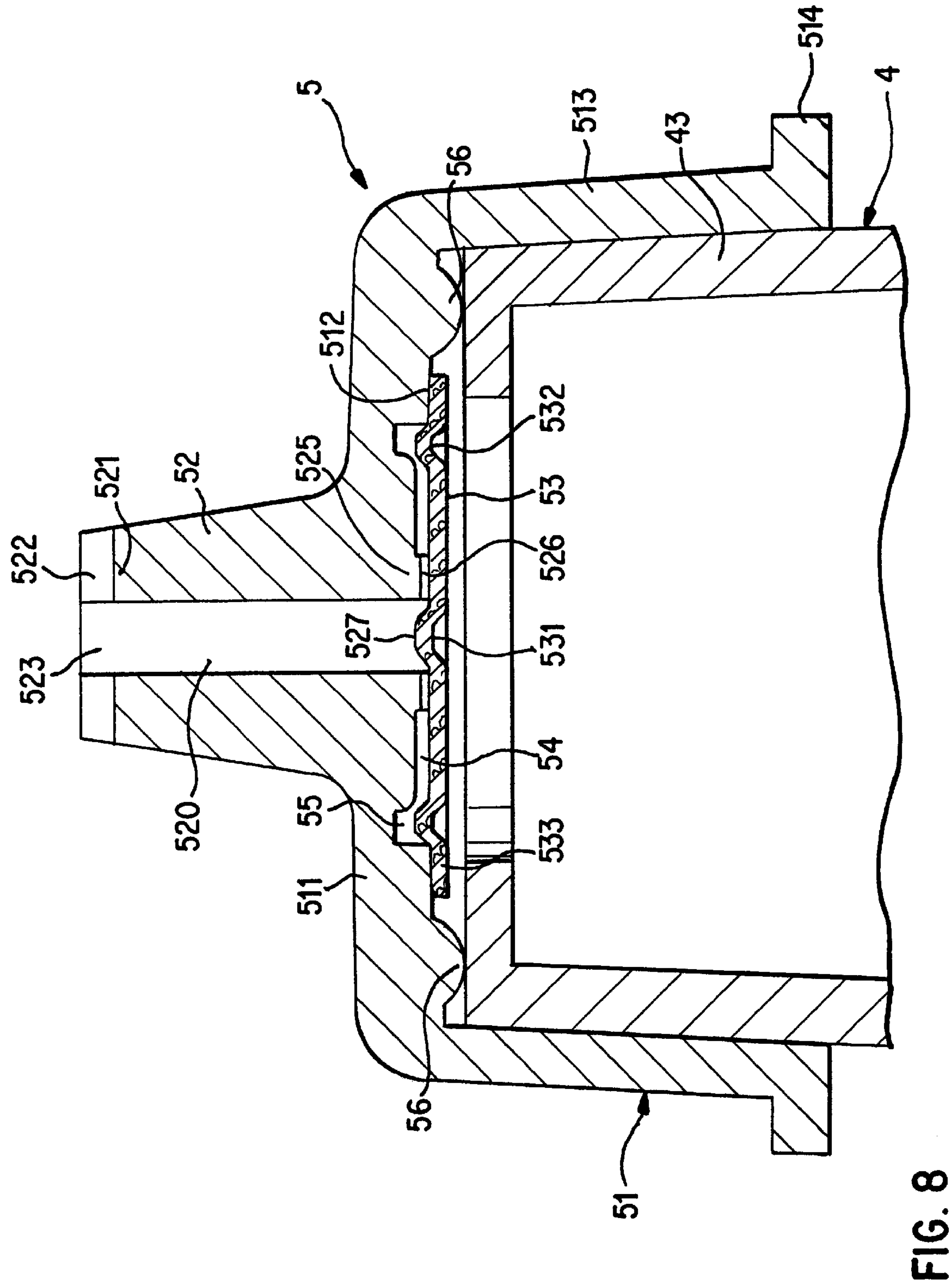
FIG. 8 is a cross-sectional view of the liquid specimen collection device mounted on the reading unit.

The recessed region 540 in the body portion 513 is configured and dimensioned to substantially correspond to the configuration and dimensions of the outer surface of the holder 43 of the reading unit 1. As shown in FIGS. 3 and 8, the body portion 513 is preferably slightly tapered on its inner surface surrounding the recessed region 540. The taper is such that the body portion 513 possesses a smaller internal diameter adjacent the end surface 542 and a larger internal diameter remote from the end surface 542. In this way, the collection device 5 can be securely mounted on the holder 43 of the reading unit 1 despite differences between the outer diameter or configuration of the holder 43 of the reading unit 1 and the internal diameter of the body portion 513 of the collection device 5.

According to the preferred embodiment, the bottom portion 511, the body portion 513 and the flange 514 are integrally formed as one unit, although they may be separately formed and assembled to one another. Further, although the tip end 52 is formed integrally with the bottom portion 511, they may also be separately formed and connected to one another.

A hole or passage 520 that is open at both ends extends through the body member 5 from one end to the opposite end. The hole 520 defines a capillary tube specimen flow path for drawing a liquid specimen or sample by capillary action from the tip end 52 towards the recessed region 540 of the body portion 513. The hole 520 extends substantially perpendicular to the test paper 53. The hole 520 opens to a specimen flow-in port 523 at the tip end 52 and opens to a specimen flow-out port 527 adjacent the recessed region 540 of the body portion 513. The end surface 542 of the body member 51 defines a body surface that surrounds and extends radially outwardly from the specimen flow-out port 527.

Figure 9:
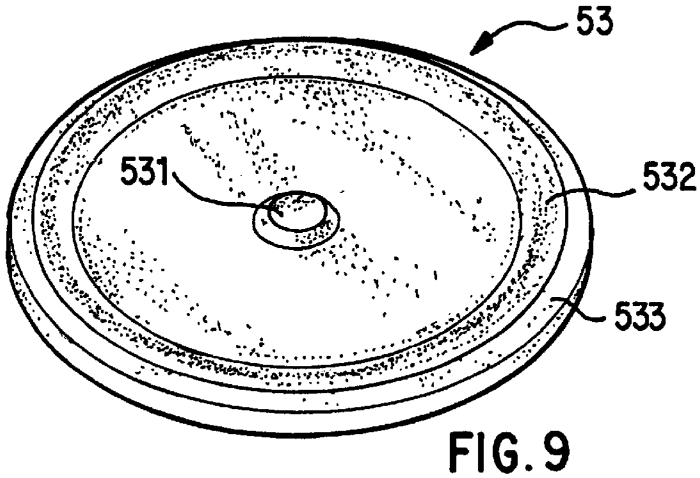
FIG. 9 is a perspective view of the test paper that is attached to the liquid specimen collection device.
Figure 10:
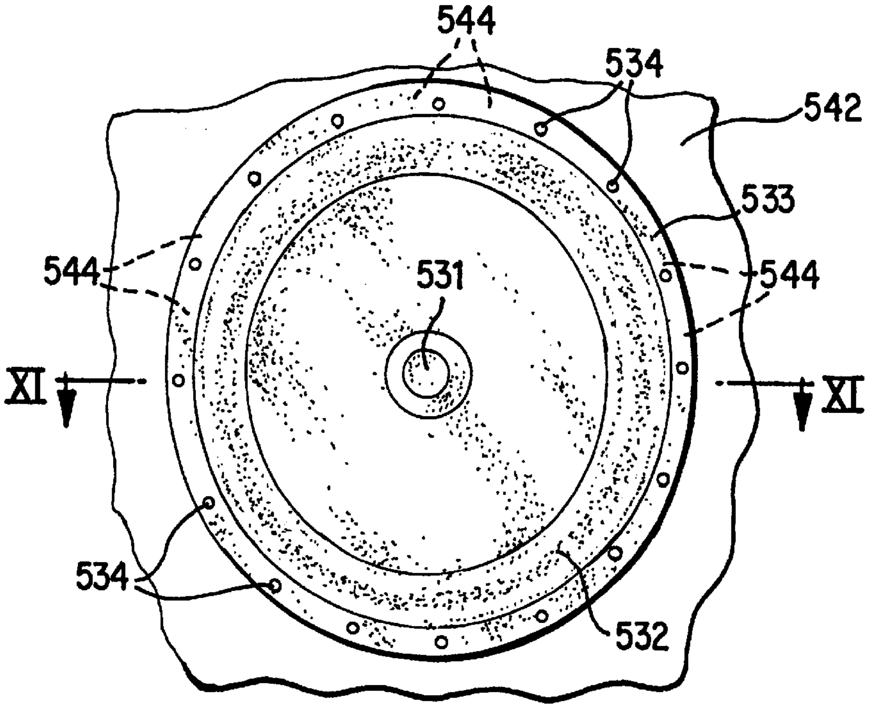
FIG. 10 is a plan view of the test paper shown in FIG. 9 mounted on the end surface of the body member.

As mentioned above, the test paper 53 is secured to a seating portion 512 of the end surface 542 of the body member 51. The test paper 53, which is generally circular in shape as seen in FIGS. 9 and 10, is adapted to be secured in place through fusion or bonding (e.g., adhesive bonding). In particular, the test paper 53 is secured to the seating portion 512 of the end surface of the body member 51 at a plurality of circumferentially spaced apart securement locations 534 disposed about the outer periphery of the test paper 53 as seen in FIG. 10. When secured to the body member 51 in this manner, a vent area 544 is defined between each pair of adjacent securement locations 534. Thus, when the test paper 53 is secured to the body member 51, a plurality of circumferentially spaced apart vent areas 544 are provided between the end surface 542 of the body member 51. In this way, when a liquid specimen is being drawn into the passage 520 by capillary action during use of the device, air is able to vent between the test paper 53 and the end surface 542 of the body member 51 by way of the vent areas 544. By securing the test paper 53 to the body member 51 by fusion or adhesive bonding, the test paper 53 can be supported or fixed to the body member 51 in a stable manner and the occurrence of undesirable gaps due to deformation of the test paper 53 (e.g., curve, distortion, waviness or the like) is prevented to thereby facilitate relatively smooth spreading of the liquid specimen.

As shown in FIG. 3, a portion of the end surface 542 of the body member 51 is recessed to define an annular gap 54 between the end surface 542 and the test paper. This gap 54 helps facilitate the flow of the liquid specimen radially outwardly as the liquid specimen reaches the flow-out port 527 of the passage 520. In this way, the liquid specimen is advantageously spread out by capillary action over the test paper 53 in a rather rapid and smooth manner.

Although the depth of the gap 54 can be dimensioned in a manner that is best suited to achieving the aforementioned function, it is preferred that the depth be greater than 0.02 mm (average), preferably between 0.04 mm and 0.4 mm. With such a dimensional range, the aforementioned function of the gap 54 can be effectively performed. In addition, the depth of the gap 54 may be constant or may vary.

An annular specimen reservoir 55 is positioned at the radially outward circumferential extent of the gap 54. The annular specimen reservoir 55 is dimensioned to be deeper than the gap 54 while at the same time communicating with the gap 54. The specimen reservoir 55 is located radially inwardly of the seating region 512 where the test paper 53 is secured to the end surface 542 of the body member 51. The annular specimen reservoir 55 is designed to restrict the radial outward flow of the liquid specimen. That is, as the liquid specimen flowing through the passage 520 reaches the flow-out port 527 and is drawn radially outwardly through assistance from the gap 54, the liquid specimen will reach the annular specimen reservoir 55, and flow into the reservoir 55, thus being prevented from flowing further radially outwardly beyond the reservoir 55. In this way, the liquid specimen will be prevented from flowing into the seating region 512 at which the test paper 53 is secured to the end surface 542 of the body member. The liquid specimen will also be prevented from flowing radially outwardly beyond the outer circumference of the test paper by way of the vent areas between the attachment regions 544 at which the test paper 53 is secured to the end surface 542 of the body member 51. Thus, even if an excessive quantity of liquid specimen is collected, leakage of the specimen beyond the outer periphery of the test paper can be prevented. This is significant from the standpoint of preventing contamination of the end of the reading unit 1 as a result of the liquid specimen contacting and adhering to the end of the reading unit.

A spacer mechanism is positioned radially outwardly of the reservoir 55. In a preferred form of the invention, the spacer mechanism consists of four spaced apart rounded protuberances or convex spacers 56. The spacers 56 can be equally spaced apart at 90° intervals from one another. As shown in FIG. 8, the spacers 56 are designed to ensure that when the collection device 5 is mounted on the holder 4 of the reading device 1, the end surface of the reading unit 1 is spaced from test strip 53. When the collection device 5 is mounted on the holder 4 of the reading device 1, the end face of the holder 4 contacts the spacers 56 to thereby prevent the end face of the holder 4 from contacting the test paper 53 in which the liquid specimen has been absorbed. As illustrated in FIG. 8, the axial extent of the spacers 56 is greater than the thickness of the test paper 53. By virtue of the spacers 56, the test paper 53 is protected from contacting the end of the reading unit 1 and soiling or contamination of the reading unit through adherence of a portion of the liquid sample on the reading unit is prevented.

Additionally, the spacers 56 function to maintain a constant separation distance between the test paper 53 and the luminous element 41 and light receiving element 42 of the light measuring portion 4. Consequently, measurement errors due to deviations in the optical characteristics, which are caused by variations in the distance between the test paper 53 and the luminous element 41 and light receiving element 42 of the light measuring portion 4, are minimized. This results in improved measurement accuracy.

Figure 4:
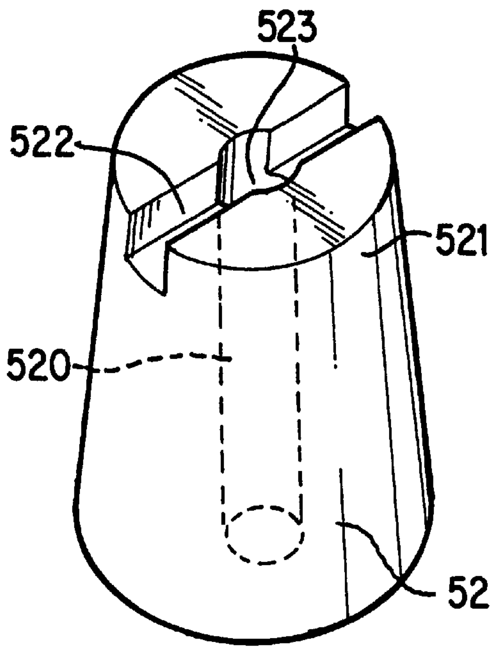
FIG. 4 is a perspective view of the sample introduction portion of the liquid specimen collection device.
Figure 5:
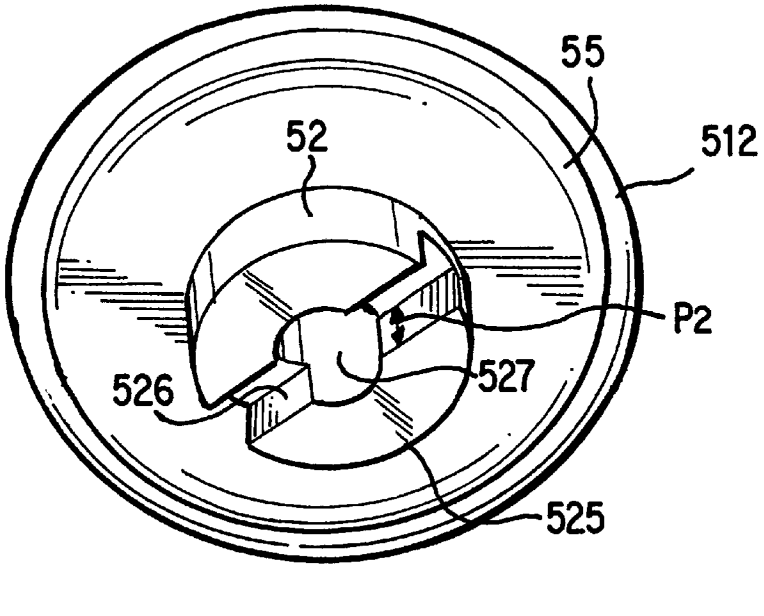
FIG. 5 is a perspective view of the specimen flow-out side of the liquid specimen collection device of the present invention.

As shown in FIGS. 3–5, one end of the tip end 52 of the body member 51 defines a specimen flow-in end portion 521 while the opposite end of the tip end 52 of the body member 51 defines a specimen flow-out end portion 525. The free end face of the specimen flow-in end portion 521 is provided with a groove 522. The groove 522 extends perpendicularly to the axis of the passage 520 and extends between the outer peripheral surface of the tip end 52 and the passage 520. Thus, both ends of the groove 522 open to the outer peripheral surface of the tip end 52.

Figure 12:
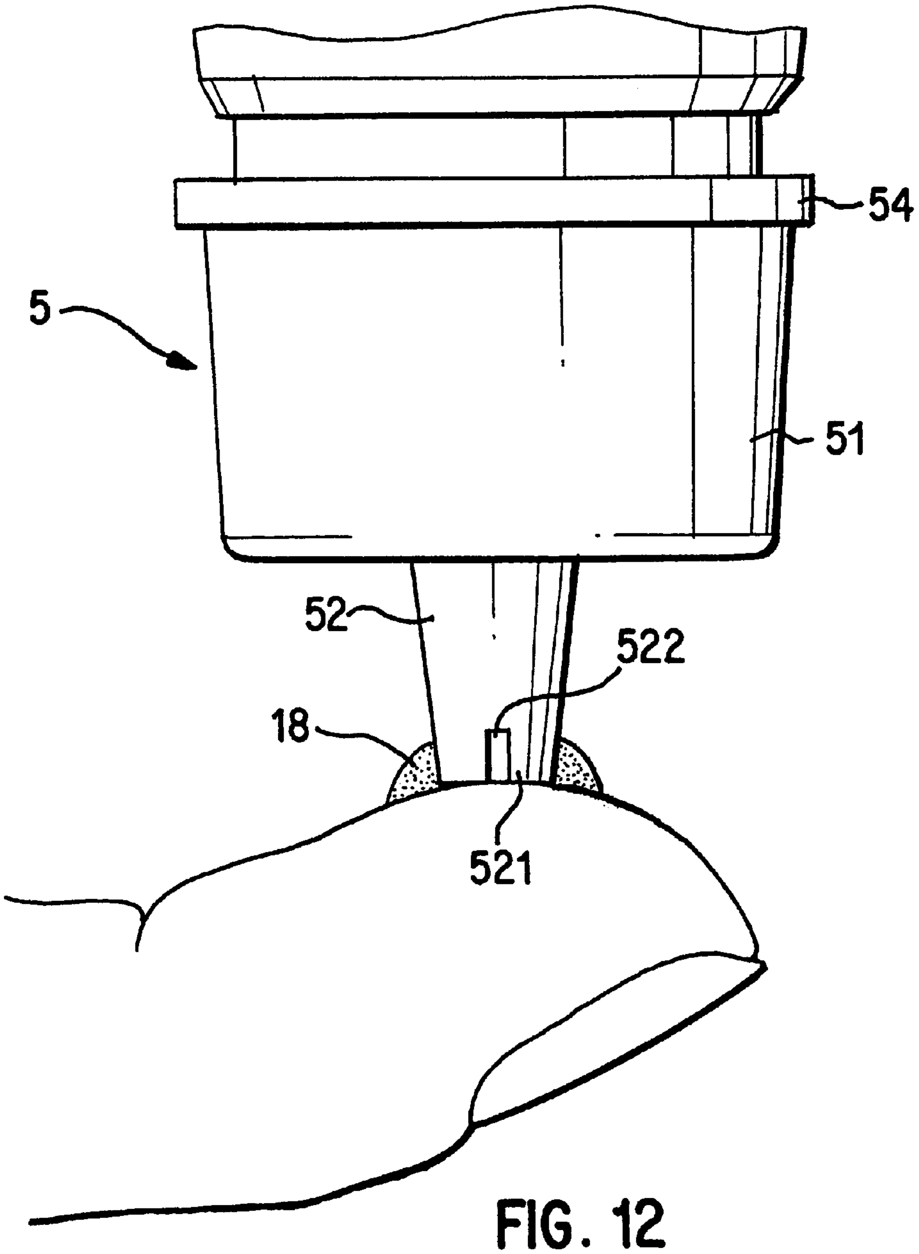
FIG. 12 is an illustration of the manner of using the measuring apparatus with the attached liquid specimen collection device of the present invention.

The groove 522 is designed to facilitate liquid specimen flow into the passage 520. When, for purposes of obtaining a specimen of blood for example, the end face of the specimen flow-in end portion 521 of the tip end 52 of the body member 51 is brought into contact with the surface of an individual's finger or the like as shown in FIG. 12, the groove 522 helps prevent the passage 520 from becoming clogged in a manner that might otherwise occur in the absence of the groove 522. Thus, the supply of blood or other liquid sample through the passage and to the test paper 53 can be smoothly carried out.

Figure 6:
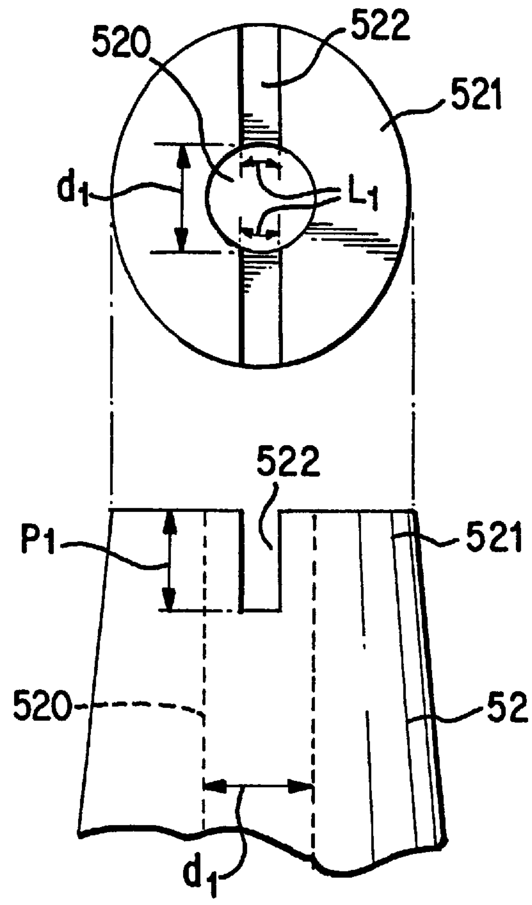
FIG. 6 is a top end view and a side view of the sample introduction portion of the liquid specimen collection device.

With reference to FIG. 6, assuming that the total circumferential length of the groove 522 with respect to the passage 520 is $L_1$ and assuming also that the internal diameter (internal diameter in the vicinity of the specimen flow-in port 523) of the passage 520 is $d_1$, the circumferential length $L_1$ and the entire internal circumferential length $2\pi d_1$ of the passage 520 preferably satisfy the following expression (I).

$$L_1<2\pi d_1\times 50\% \quad \text{(I)}$$

By designing the groove 522 and the passage 520 to satisfy the foregoing expression, the start of suction of the specimen (i.e., the start of flow of the specimen into the passage 520 by capillary action) can be achieved rapidly and smoothly.

The depth $P_1$ of the groove 522 is preferably selected based on, for example, skin conditions. The depth $P_1$ is typically and preferably greater than 0.1 mm, preferably between 0.2 mm and 1.8 mm. If the depth $P_1$ is too small (i.e., if the groove 522 is excessively shallow), transport or movement of the specimen such as blood through the groove 522 may become insufficient if the pressure to the skin is too large.

It is to be understood that the shape, number, positioning and other characteristics associated with the groove 522 are not restricted to those shown in the drawing figures. If the use of the collection device does not require that the end face of the specimen flow-in end portion 521 of the tip end 52 of the body member 51 make contact with the skin to obtain a sample or specimen, variations on the illustrated construction can be employed. For example, a plurality of grooves 522 may be formed radially (for example in a cross shape pattern) around the specimen flow-in port 523 of the passage 520.

As seen in FIGS. 3 and 8, the specimen flow-out end portion 525 of the tip end 52 of the body member 51 has a protruding portion which protrudes a slight distance axially towards the recessed region 540 of the body member 51 as compared to the adjacent recess defining the gap 54. Thus, the gap 54 is bounded on its radially inner end by this protruding portion. The test paper 53 contacts the end face of this protruding portion as seen in FIGS. 3 and 8. A radially extending groove 526 is provided in the end face of this protruding portion to communicate the passage 520 with the gap 54. Thus, both ends of the groove 526 open to the gap 54.

By virtue of this groove 526, the liquid specimen passing through the passage 520 is able to spread outwardly from the specimen flow-out port 527 through the groove 526. This helps facilitate the spreading of the specimen outwardly over the test paper 53. Thus, the spreading of the liquid specimen is performed rapidly and relatively uniformly, thus contributing to achieving an accurate measurement of the characteristic being measured.

Figure 7:
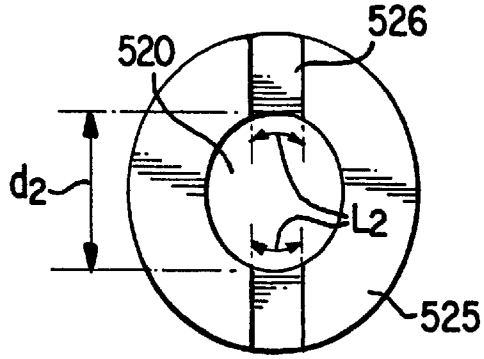
FIG. 7 is an end view of the sample flow-out side of the liquid specimen collection device.

With reference to FIG. 7, assuming that the total circumferential length of the boundary of the groove 526 with respect to the passage 520 is $L_2$ and assuming also that the internal diameter (internal diameter in the vicinity of the specimen flow-out port 527) of the passage 520 is $d_2$, the circumferential length $L_2$ and the entire internal circumference $2\pi d_2$ of the passage 520 preferably satisfy the following expression (II).

$$L_2<2d_2\times 50\% \quad \text{(II)}$$

By designing the groove 526 and the passage 520 to satisfy the foregoing expression, diffusion and spreading of the liquid specimen flowing out from the specimen flow-out port 527 of the passage 520 can be achieved rapidly and smoothly.

The shape and location of the groove 526 is not limited to that shown in FIGS. 3, 7 and 8. For example, it is possible to form a plurality of radially extending grooves 526 (for example in a cross shape) around the specimen flow-out port 527 of the passage 520.

During use of the present invention as generally illustrated in FIG. 12, the tip end 52 of the blood collection device is placed adjacent the liquid sample to be collected (e.g., blood from an individual's finger), whereupon the liquid sample is drawn up into the passage 520 by capillary action and supplied to the test paper 53. The internal diameter (average) of the passage 520 is on the order of about 0.2 mm–2.0 mm, preferably about 0.5 mm–1.0 mm. If the internal diameter of the passage 520 is too large, transportation of the liquid specimen by capillary action may become difficult. On the other hand, if the internal diameter of the passage 520 is too small, the speed at which the liquid specimen flows through the passage 520 may be too slow and may require an excessively long time to supply a sufficient amount of the liquid sample to the test paper 53.

The internal diameter or cross-section of the passage 520 may be constant along the length of the passage 520 or may vary. The overall length of the passage 520 between the opposite open ends is preferably in the range of about 1 mm–5 mm, more preferably in the range of about 2 mm–4 mm.

The body member 51, including the tip end 52 and the body portion 513, is formed of rigid material having a specified stiffness. The rigid material includes acrylic resin, polystyrene, polyethylene, polypropylene, hard polyvinylidene chloride, polycarbonate, poly methyl methacrylate, ABS resin, polyester, polyphenylene sulfide (PPS), polyamide, polyimide, polyacetal, polymer alloy or polymer bend or the like, containing at least one of the aforementioned substances, and the like. Of these substances, a substance that has been found to be particularly suitable for introducing and spreading the liquid specimen rapidly is a hydrophilic material such as acrylic resin or hydrophilically treated material.

The hydrophilic treatment can be carried out by physical activation treatment such as plasma treatment, glow discharge, corona discharge, ultraviolet ray radiation and the like, or by applying (coating) a surface active agent, water-soluble silicone, hydroxypropyl cellulose, polyethylene glycols, polypropylene glycols or the like.

The test paper 53 carries reagent (colored reagent) by soaking in a carrier capable of absorbing specimen. This carrier is preferably composed of a porous film or sheet-like porous medium that is capable of absorbing the liquid specimen. Examples include unwoven cloth, woven cloth, drawn sheet or the like. When the present invention is used to obtain a blood specimen, the porous film preferably has a porosity capable of filtering red blood cells in the blood. The reagent is appropriately selected depending upon the characteristic(s) or component(s) of the liquid sample to be measured (e.g., blood sugar level in a blood specimen).

The test paper preferably includes a carrier made of a porous film and so where the reagent is designed to react with oxygen in the atmosphere as a medium like oxidase reaction, even after the specimen is spread over the test paper 53 so that the specimen receiving side is covered with the specimen, the aforementioned reaction can progress rapidly because oxygen in the atmosphere is supplied to the detecting side. Also, because the porous film has a porosity capable of filtering red blood cells in the blood, coloring condition can be detected without removing the specimen or its filtered component (red blood cell, etc.).

Although the material forming the porous film can include material from the polyester group, polyamide group, polyolefin group, polysulfone, cellulose and the like, because it is soaked with water solution in which reagent is dissolved or it filters blood corpuscles upon measurement, materials having hydrophilic characteristics or a hydrophically treated material is preferred. The hydrophilic treatment can be performed in the same way described above with respect to the body member.

When the liquid specimen collection device is used to obtain a specimen of blood, the reagent to be soaked in the porous film for measurement of, for example, the blood sugar level includes glucose oxidase (GOD), peroxidase (POD) and coloring agent (coloring reagent) such as 4-amino aminoantipyrine, N-ethylN-(2-hydroxy-3-sulfopropyl)-m-toluidine. Additionally, depending on the measurement component, it may include a substance which reacts with blood components such as ascorbate oxidase, alcohol oxidase, cholesterol oxidase and the like, and coloring agent (coloring reagent) like mentioned previously. Further, that reagent may contain a buffer agent such as a phosphate buffer. It is to be understood that the types and components of the reagent are not limited to those described above.

The present invention also involves a particular construction and configuration of the test paper 53, the details of which are best seen from FIGS. 8–11. Although the shape of the test paper 53 is preferably circular, test papers having other shapes such as oval, square, rectangle, diamond, triangle, hexagon, octagon or the like can be used.

In the case of a circular test paper 53, the outside diameter of the test paper 53 is preferably on the order of about 2 mm–10 mm, more preferably about 4 mm–7 mm. The thickness of the test paper 53 can be in the range of about 0.02 mm–1.0 mm, preferably about 0.05 mm–0.4 mm.

The test paper 53 is provided with a centrally located and axially extending convex portion or protuberance 531 that extends out of the plane of the test paper 53. When the test paper 531 is mounted on the end surface 542 of the body member 51 as seen in FIGS. 3 and 8, the protuberance 531 extends or protrudes towards the passage 520. Although the height or axial extent of the protuberance 531 is not restricted to any specific dimension, the protuberance 531 is preferably dimensioned so that it extends or protrudes into the passage 520 (i.e., the protuberance 531 extends beyond the protruding portion of the body member 51 in which the groove 526 is formed), thereby being located in the specimen flow-out port 527. The height of the protuberance 531 can thus be on the order of about 0.02 mm–1.0 mm, preferably about 0.05 mm–0.4 mm.

The shape and outer dimension of the protuberance 531 is preferably the same as or smaller than the internal diameter of the passage 520 at the specimen flow-out port 527. The shape, dimensions and other characteristics of the protuberance 531 are not limited by the foregoing, and are preferably appropriately selected depending upon, for example, the cross-sectional shape and dimensions of the passage 520.

The protuberance 531 imparts advantageous characteristics to the test paper 53 from the standpoint of facilitating the supply of the liquid sample to the test paper 53. That is, by virtue of the protuberance 531, liquid specimen in the passage 520 first contacts the test paper 53 at the protuberance 531 which preferably extends into the specimen flow-out port 527 which means that the liquid specimen is rapidly supplied to the test paper 53.

The test paper 53 is also provided with an axially extending annular convex portion or protuberance 532 which protrudes in the same direction as the protuberance 531. This annular protuberance 532 is positioned radially outwardly of the centrally located protuberance 531, and is disposed adjacent the outer circumference of the test paper 53. The end portion of the protuberance 532 is positioned in the specimen reservoir 55 when the test strip 53 is mounted on the end surface 542 of the body member 51 as seen in FIGS. 3 and 8.

The annular protuberance 532 is adapted to restrict the outward spreading of the liquid specimen on the test paper 53. Consequently, excess liquid specimen is prevented from flowing out beyond the annular protuberance 532 towards the outer periphery of the test strip.

The outer diameter of the annular protuberance 532 is not restricted to any particular value, although it is preferred that the outer diameter of the annular protuberance 532 be 60%–95% of the outside diameter of the test paper 53, and preferably 70%–90% of the outside diameter of the test paper 53.

It is preferred that the width of the annular protuberance 532 be on the order of about 0.03 mm–1.0 mm, preferably in the range of about 0.05 mm–0.5 mm. The height of the annular protuberance 532 can be about 0.02 mm–1.0 mm, preferably in the range of about 0.05 mm–0.4 mm.

The shape and dimensions (e.g., diameter, width, height and the like) of the annular protuberance 532 can be appropriately selected depending on the shape and other characteristics of the body member 51.

The hemispherical protuberance 531 and the annular protuberance 532 can be formed by embossing (e.g., by pressing the bottom end of the test paper 53 through use of a punch) or cutting out.

Figure 11:
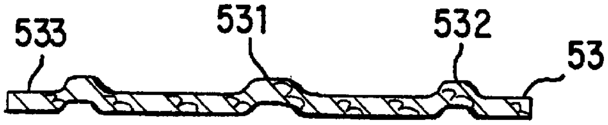
FIG. 11 is a cross-sectional view of the test paper taken along the section line XI—XI in FIG. 10, but with the illustration of the body member being omitted.

As shown in FIGS. 9–11, the external circumference of the test paper 53 is provided with a fixing portion 533 that serves as the region at which the test paper is secured to the body member 51. The fixing portion 533 is located radially outwardly of the annular convex portion 532. As described above, the test paper 53 is fixed to the seating portion 512 of the body member 51 at this fixing portion 533 by fusion or adhesive bonding.

FIG. 12 illustrates one way in which the specimen collection device of the present invention can be used, namely in the context of collecting a blood specimen. As shown in FIG. 12, an individual's finger or other portion of the body is pierced with, for example, a needle to allow a small amount (e.g., 2–6 $\mu$l) of blood 18 to flow to the surface of the skin.

The specimen collection device 5 is mounted on the holder 43 of the light measuring portion 4 of the reading apparatus 1, and the end face of the specimen flow-in end portion 521 at the tip end 52 of the collection device 5 is brought into contact with or close proximity to the skin. The blood 18 from the finger reaches the specimen flow-in port 523 through the groove 522 and is drawn by capillary action along the passage 520 towards the test paper 53. Because the blood 18 is effectively drawn into the passage 520 from open side portions of the groove 522, the blood is not excessively spread over the skin or lost when the end face of the tip end 52 of the body member 51 is placed against or in very close proximity to the skin.

Blood flowing through the passage 520 and reaching the specimen flow-out port 527 comes into contact with the convex portion 531 of the test paper 53 where a portion is absorbed by the test paper 53 and a portion flows radially outwardly through the groove 526 and along the body surface defined by the end surface 542 of the body member 51. The blood flowing outwardly through the groove 526 reaches the gap 54 and a portion is absorbed by the test paper 53 in the vicinity of the gap 54 while another portion is spread radially outwardly toward the outer circumference of the test paper 53. With absorption and spreading of blood by the test paper 53, particularly absorption in the vicinity of the protuberance 531, an additional absorptive force is generated in the passage 520 so that blood can be continuously drawn towards and supplied to the test paper 53.

Thus, by constructing the specimen collection device in accordance with the present invention, when the amount of blood 18 from which a specimen or sample is to be collected is relatively small, the blood can nevertheless be supplied to the test paper 53 without waste. On the other hand, if the amount of blood 18 from which a specimen or sample is to be collected is large so that an excessive amount thereof is supplied to the test paper 53, the excess blood is deposited in the specimen reservoir 55, thus preventing outward flow of the blood beyond the outer circumference of the test paper 53. The outward flow of blood beyond the outer circumference of the test paper 53 is also prevented by the annular protuberance 532 on the test paper 53. Therefore, blood is prevented from leaking out beyond the edge of the test paper 53 and soiling the end surface 542 of the main body 51, thus ensuring that the light measuring portion 4 and surrounding portions of the reading unit 1 do not become dirtied through adherence of blood. As a result, measurement results during subsequent uses of the reading unit are not adversely affected. Further, when the specimen collection device 5 is disposed after use, the risk of contamination or infection of personnel is reduced and so there is little safety risk.

Once the spreading of blood over the test paper 53 is completed, a target component in the blood (e.g., glucose) reacts with the reagent carried by the test paper 53 so that a color is represented depending on the amount of the target component. By measuring the intensity of the represented color by the aforementioned method, the amount of the target component (e.g., blood sugar level) in the blood is determined. Because red blood cells and the like in the blood are filtered and captured in the gap 54, they do not adversely affect the measurement of color represented on the test paper 53.

As described above, through use of the collection device 5 according to the present invention, blood can be supplied and spread over the test paper 53 rapidly and reliably by a simple operation regardless of the amount of blood 18 present on the skin. Thus, measurement errors do not often occur, thereby contributing to improvement of the measurement accuracy. Further, the collection of a liquid sample or specimen involves little human intervention from the standpoint of placing the specimen or sample on the test strip and so errors associated with human involvement tend to be reduced or eliminated.

The specimen collection device of the present invention can be used not only for the collection of a blood specimen, but other types of liquid specimens as well. For example, urine, lymph, cerebrospinal fluid, saliva and other similar body fluids, or diluted and concentrated fluids thereof.

Further, the component to be measured in the specimen may be albuminoid, cholestero, uric acid, creatinine, alcohol, inorganic ion such as sodium, hemoglobin and the like.

According to the present invention, the specimen collection device and the reading unit on which the device is mounted permit a relatively rapid and reliable collection of a desired specimen, regardless of the type and quantity of the specimen, the collection position or the collection method, while also permitting realization of accurate measurement results.

Further, the specimen collection device is easy to handle, particularly with respect to attachment and detachment of the tip with respect to the reading apparatus. An appropriate mounting condition of the specimen collection device on the reading unit can be obtained easily and reliably and in a manner that is designed to avoid measuring errors and deviations in measured results due to improper or inaccurate mounting of the device on the reading unit.

Further, contamination or soiling of the reading unit due to some of the specimen becoming adhered to the reading unit is avoided, and a high degree of safety is possible.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A liquid specimen collection device mountable on a reading unit which measures a characteristic of a liquid specimen, comprising:

a body member including a recessed portion at one end for receiving the reading unit and a specimen introduction portion at the opposite end for placement adjacent a liquid specimen, the body member being provided with a hole defining a capillary tube specimen flow path that is open at oppositely located first and second ends, the first end of the hole opening to the specimen introduction portion and the second end of the hole opening into the recessed portion, the body member including a body surface that surrounds and extends outwardly from the second end of the hole; and a test paper carrying a chromatic reagent and having oppositely located first and second surfaces, the test paper being mounted within the recessed portion of the body member with the first surface of the test paper facing the body surface so that a liquid specimen introduced into the hole at the first end flows by capillary action through the capillary tube liquid specimen flow path towards the second end of the hole and contacts the test paper, the test paper possessing a flat shape lying in a plane, the test paper including an axially extending annular protuberance extending around an outer circumferential portion of the test paper, said annular protuberance extending out of the plane of the test paper in a direction towards the body surface of the body member.

2. A liquid specimen collection device as recited in claim 1, wherein the specimen introduction portion has an end surface and an outer peripheral surface, the end surface of the specimen introduction portion being provided with at least one groove extending between the outer peripheral surface of the tip end and the hole in the body member.

3. A liquid specimen collection device as recited in claim 1, wherein the test paper is secured to the body member at a plurality of spaced apart securement locations along a peripheral portion of the test paper with gaps being located between adjacent securement locations through which air is permitted to flow during liquid specimen flow along the capillary tube liquid specimen flow path.

4. A liquid specimen collection device as recited in claim 1, wherein the test paper possesses a flat shape which lies in a plane, said test paper having a center portion provided with an axially extending protuberance that extends out of said plane.

5. A liquid specimen collection device as recited in claim 4, wherein said protuberance extends into the hole in the body member.

6. A liquid specimen collection device as recited in claim 1, wherein said body member includes an annular specimen reservoir formed in the body surface of the body member, said annular protuberance extending into the specimen reservoir.

7. A liquid specimen collection device as recited in claim 1, including at least one protuberance extending axially away from the body surface and located radially outwardly of the hole for spacing an end face of a reading unit from the test paper when the collection device is mounted on an end of the reading unit.

8. A liquid specimen collection device mountable on a reading unit which measures a characteristic of a liquid specimen, comprising:

a body member provided with a hole defining a capillary tube specimen flow path that extends between opposite ends of the body member and that is open at both ends, one end of the hole opening at a tip end of the body member that is positionable adjacent a liquid specimen for introducing the liquid specimen into the hole, the opposite end of the hole opening at a body surface of the body which surrounds and extends outwardly from the opposite end of the hole, the tip end of the body member having an end surface and an outer peripheral surface, the end surface of the tip end of the body member being provided with at least one groove extending between the outer peripheral surface of the tip end and the hole in the body member; and a test paper carrying a chromatic reagent and having oppositely located first and second surfaces, the test paper being mounted on the body member with the first surface of the test paper facing the body surface of the body member so that a liquid specimen introduced into the hole at the tip end flows by capillary action along the capillary tube liquid specimen flow path towards the opposite end and contacts the test paper.

9. A liquid specimen collection device as recited in claim 8, wherein the test paper is secured to the body member at a plurality of spaced apart securement locations along a peripheral portion of the test paper with gaps being located between adjacent securement locations through which air is permitted to flow during liquid specimen flow along the capillary tube liquid specimen flow path.

10. A liquid specimen collection device as recited in claim 8, wherein the test paper possesses a flat shape which lies in a plane, said test paper having a center portion provided with an axially extending protuberance that extends out of said plane.

11. A liquid specimen collection device as recited in claim 10, wherein said protuberance extends into the hole in the body member.

12. A liquid specimen collection device as recited in claim 8, wherein the test paper possesses a flat shape which lies in a plane, the test paper including an axially extending annular protuberance extending around an outer circumferential portion of the test paper, said annular protuberance extending out of the plane of the test paper in a direction towards the body surface of the body member.

13. A liquid specimen collection device as recited in claim 12, wherein said body member includes an annular specimen reservoir formed in the body surface of the body member, said annular protuberance extending into the specimen reservoir.

14. A liquid specimen collection device as recited in claim 8, including at least one protuberance extending axially away from the body surface and located radially outwardly of the hole for spacing an end face of a reading unit from the test paper when the collection device is mounted on an end of the reading unit.

15. A liquid specimen collection device as recited in claim 8, wherein said body member is provided with a recess that receives an end of a reading unit, said recess having a bottom surface defined by the body surface.

16. A liquid specimen collection device mountable on a reading unit which measures a characteristic of a liquid specimen, comprising:

a body member provided with a hole defining a capillary tube specimen flow path that extends between opposite ends of the body member and that is open at both ends, one end of the hole opening at a tip end of the body member that is positionable adjacent a liquid specimen for introducing the liquid specimen into the hole, the opposite end of the hole opening at a body surface of the body which surrounds and extends outwardly from the opposite end of the hole; and a test paper carrying a chromatic reagent and having oppositely located first and second surfaces, the test paper being secured to the body member with the first surface of the test paper facing the body surface of the body member so that a liquid specimen introduced into the hole at the tip end flows by capillary action along the capillary tube liquid specimen flow path towards the opposite end and contacts the test paper, the test paper being secured to the body member at a plurality of spaced apart securement locations along a peripheral portion of the test paper with gaps being located between adjacent securement locations through which air is permitted to flow during liquid specimen flow along the capillary tube liquid specimen flow path, the test paper possessing a flat shape which lies in a plane, said test paper having a center portion provided with an axially extending protuberance that extends out of said plane.

17. A liquid specimen collection device as recited in claim 16, wherein said protuberance extends into the hole in the body member.

18. A liquid specimen collection device as recited in claim 16, wherein the test paper possesses a flat shape which lies in a plane, the test paper including an axially extending annular protuberance extending around an outer circumferential portion of the test paper, said annular protuberance extending out of the plane of the test paper in a direction towards the body surface of the body member.

19. A liquid specimen collection device as recited in claim 16, wherein the opposite end of the hole extending through the body member is surrounded by a protruding portion, said protruding portion being provided with a groove for permitting a liquid specimen to flow radially outwardly from the opposite end of the hole.

20. A liquid specimen collection device as recited in claim 16, wherein the tip end of the body member has an end surface and an outer peripheral surface, the end surface of the tip end being provided with at least one groove extending between the outer peripheral surface of the tip end and the hole in the body member.

21. A liquid specimen collection device as recited in claim 16, including at least one protuberance extending axially away from the body surface and located radially outwardly of the hole for spacing an end face of a reading unit from the test paper when the collection device is mounted on an end of the reading unit.

22. A liquid specimen collection device mountable on a reading unit which measures a characteristic of a liquid specimen, comprising:

a body member provided with a hole defining a capillary tube specimen flow path that extends between opposite ends of the body member and that is open at both ends, one end of the hole opening at a tip end of the body member that is positionable adjacent a liquid specimen for introducing the liquid specimen into the hole, the opposite end of the hole opening at a body surface of the body which surrounds and extends outwardly from the opposite end of the hole; and a test paper carrying a chromatic reagent, the test paper being provided with an axially extending protuberance, the test paper being secured to the body surface of the body member with the protuberance of the test paper being aligned with the hole in the body member so that a liquid specimen introduced into the hole at the tip end flows by capillary action along the capillary tube liquid specimen flow path towards the opposite end of the hole where the liquid specimen contacts the protuberance of the test paper and is absorbed into the test paper.

23. A liquid specimen collection device as recited in claim 22, wherein said axially extending protuberance extends into the hole in the body member.

24. A liquid specimen collection device as recited in claim 22, wherein the test paper includes an axially extending annular protuberance extending around an outer circumferential portion of the test paper, said annular protuberance extending towards the body surface of the body member.

25. A liquid specimen collection device as recited in claim 22, wherein the test paper is secured to the body member at a plurality of spaced apart securement locations along a peripheral portion of the test paper with gaps being located between adjacent securement locations through which air is permitted to flow during liquid specimen flow along the capillary tube liquid specimen flow path.

26. A liquid specimen collection device as recited in claim 22, wherein the tip end of the body member has an end surface and an outer peripheral surface, the end surface of the tip end being provided with at least one groove extending between the outer peripheral surface of the tip end and the hole in the body member.

27. A liquid specimen collection device mountable on a reading unit which measures a characteristic of a liquid specimen, comprising:

a body member provided with a hole defining a capillary tube specimen flow path that extends between opposite ends of the body member and that is open at both ends, one end of the hole opening at a tip end of the body member that is positionable adjacent a liquid specimen for introducing the liquid specimen into the hole, the opposite end of the hole opening at a body surface of the body which surrounds and extends outwardly from the opposite end of the hole; and a test paper carrying a chromatic reagent and having oppositely located first and second surfaces, the test paper being secured to the body member with the first surface of the test paper facing the body surface of the body member so that a liquid specimen introduced into the hole at the tip end flows by capillary action along the capillary tube liquid specimen flow path towards the opposite end and contacts the test paper, the test paper possessing a flat shape which lies in a plane, said test paper being provided with an axially extending protuberance that extends out of said plane of said test paper.

28. A liquid specimen collection device as recited in claim 27, wherein the opposite end of the hole extending through the body member is surrounded by a protruding portion, said protruding portion being provided with a groove for permitting a liquid specimen to flow radially outwardly from the opposite end of the hole.

29. A liquid specimen collection device as recited in claim 27, wherein the tip end of the body member has an end surface and an outer peripheral surface, the end surface of the tip end being provided with at least one groove extending between the outer peripheral surface of the tip end and the hole in the body member.

30. A liquid specimen collection device as recited in claim 27, including at least one protuberance extending axially away from the body surface and located radially outwardly of the hole for spacing an end face of a reading unit from the test paper when the collection device is mounted on an end of the reading unit.

* * * * *

UNITED STATES PATENT AND TRADEMARK OFFICE

CERTIFICATE OF CORRECTION

PATENT NO. : 6,083,460

DATED : July 4, 2000

INVENTOR(S) : Naoki MORIKAWA, et al.

It is certified that error appears in the above-identified patent and that said Letters Patent is hereby corrected as shown below:

In column 8, line 45, "$L_2 < 2d_2x50\%$" is deleted, and --$L_2 < 2\pi d_2x50\%$-- is inserted.

Signed and Sealed this

Seventeenth Day of April, 2001

*Attest:*

NICHOLAS P. GODICI

*Attesting Officer*

*Acting Director of the United States Patent and Trademark Office*